(12) United States Patent
Nepomniachtchi et al.

(10) Patent No.: US 10,546,206 B2
(45) Date of Patent: *Jan. 28, 2020

(54) METHODS FOR MOBILE IMAGE CAPTURE OF VEHICLE IDENTIFICATION NUMBERS IN A NON-DOCUMENT

(71) Applicant: Mitek Systems, Inc., San Diego, CA (US)

(72) Inventors: Grigori Nepomniachtchi, San Diego, CA (US); Nikolay Kotovich, San Diego, CA (US)

(73) Assignee: MITEK SYSTEMS, INC., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/153,499

(22) Filed: Oct. 5, 2018

(65) Prior Publication Data
US 2019/0138837 A1    May 9, 2019

Related U.S. Application Data

(63) Continuation of application No. 15/714,362, filed on Sep. 25, 2017, now Pat. No. 10,095,947, which is a continuation of application No. 14/217,361, filed on Mar. 17, 2014, now Pat. No. 9,773,186.

(60) Provisional application No. 61/801,993, filed on Mar. 15, 2013.

(51) Int. Cl.
| | |
|---|---|
| *G06K 9/00* | (2006.01) |
| *G06K 9/34* | (2006.01) |
| *G06K 9/03* | (2006.01) |
| *G06K 9/20* | (2006.01) |
| *G06K 9/38* | (2006.01) |

(Continued)

(52) U.S. Cl.
CPC ........ *G06K 9/344* (2013.01); *G06K 9/00442* (2013.01); *G06K 9/03* (2013.01); *G06K 9/2054* (2013.01); *G06K 9/38* (2013.01); *G06K 9/4652* (2013.01); *G06K 9/726* (2013.01)

(58) Field of Classification Search
CPC .... G06K 9/00442; G06K 9/03; G06K 9/2054; G06K 9/344; G06K 9/4652; G06K 9/726; G06K 2209/01; G06K 2209/015
See application file for complete search history.

(56) References Cited

U.S. PATENT DOCUMENTS

| | | |
|---|---|---|
| 9,773,186 B2 | 9/2017 | Nepomniachtchi et al. ............... G06K 9/344 |
| 10,095,947 B2 * | 10/2018 | Nepomniachtchi et al. ............... G06K 9/344 |
| 2011/0075936 A1 | 3/2011 | Deaver .................. 382/200 |

(Continued)

OTHER PUBLICATIONS

"OCR: The Most Important Scanning Feature You Never Knew You Needed." hp (blog), Feb. 24, 2012. Accessed May 13, 2015. http://h71036.www7.hp.com/hho/cache/608037-0-0-39-121.html.

(Continued)

*Primary Examiner* — Andrew W Johns
(74) *Attorney, Agent, or Firm* — Procopio, Cory, Hargreaves & Savitch LLP; Noel C. Gillespie

(57) ABSTRACT

Various embodiments disclosed herein are directed to methods of capturing Vehicle Identification Numbers (VIN) from images captured by a mobile device. Capturing VIN data can be useful in several applications, for example, insurance data capture applications. There are at least two types of images supported by this technology: (1) images of documents and (2) images of non-documents.

20 Claims, 9 Drawing Sheets

(51) Int. Cl.
*G06K 9/72* (2006.01)
*G06K 9/46* (2006.01)

(56) References Cited

U.S. PATENT DOCUMENTS

2011/0249905 A1 10/2011 Singh .......................... 382/225
2012/0106802 A1 5/2012 Hsieh et al. ................. 382/105

OTHER PUBLICATIONS

Relativity. "Searching Manual." Aug. 27, 2010. Accessed May 13, 2015. http://www.inventus.com/wp-content/uploads/2010/09/Relativity-Searching-Manual-6.6.pdf.

Abdulkader et al. 2009. "Low Cost Correction of OCR Errors Using Learning in a Multi-Engine Environment." Proceedings of the 2009 10th International Conference on Document Analysis and Recognition (ICDAR '09). IEEE Computer Society, Washington, DC, USA, 576-580. DOi=10.1109/ICDAR.2009.242 http://dx.doi.org/10.1109/ICDAR.2009.24.

Junker et al. "Evaluating OCR and non-OCR text representation for learning document classifiers." Proceedings on the 4th International Conference on Document Analysis and Recognition. Ulm, Germany, Aug. 18-20, 1997, pp. 1061-1066 (1997). Accessed http://citeseerx.ist.psu.edu/viewdoc/download?doi=10.1.1.6.6732&rep=repl&type=pdf.

Shah et al. "OCR-based chassis-number recognition using artificial neural networks." Vehicular Electronics and Safety (ICVES), 2009 IEEE International Conference on, pp. 31-34, Nov. 11-12, 2009.

Chattopadhyay et al. "On the Enhancement and Binarization of Mobile Captured Vehicle Identification Number for an Embedded Solution." Document Analysis Systems (DAS), 2012 10th IAPR International Workshop on, pp. 235-239, Mar. 27-29, 2012.

Bassil et al.. "OCT Post Processing Error Correction Algorithm Using Google's Online Spelling Suggestion." Journal of Emerging Trends in Computing and Information Services. 3(1) (Jan. 2012). Accessed May 13, 2015. http://arxiv.org/ftp/arxiv/papers/1204//1204.0191.pdf.

Cook. "Three Algorithms for Converting Color to Grayscale." Singular Value Consulting. Aug. 24, 2009. Accessed May 13, 2015. http://www.johndcook.com/blog/2009/08/24/algorithms-convert-color-grayscale/.

* cited by examiner (this image is intentionally blurry)

METHODS FOR MOBILE IMAGE CAPTURE OF VEHICLE IDENTIFICATION NUMBERS IN A NON-DOCUMENT

CROSS-REFERENCE TO RELATED APPLICATIONS

This application is a continuation of U.S. patent application Ser. No. 15/714,362, filed on Sep. 25, 2017, which is a continuation of U.S. patent application Ser. No. 14/217,361, filed on Mar. 17, 2014 and issued on Sep. 26, 2017 as U.S. Pat. No. 9,773,186, which claims priority to U.S. Provisional Patent application No. 61/801,993, filed on Mar. 15, 2013, all of which are hereby incorporated by reference in their entirety.

BACKGROUND

1. Field of the Invention

Various embodiments disclosed herein are directed to methods of capturing Vehicle Identification Numbers from images. Capturing VIN data can be useful in several applications, for example, Insurance data capture applications.

2. Related Art

Mobile phone adoption continues to escalate, including ever-growing smart phone adoption and tablet usage. Mobile imaging is a discipline where a consumer takes a picture of a document, and that document is processed, extracting and extending the data contained within it for selected purposes. The convenience of this technique is powerful and is currently driving a desire for this technology throughout financial services and other industries.

A Vehicle Identification Number ("VIN") is a unique, standardized identification number that appears on every automobile manufactured today. The VIN is used in many applications to identify a vehicle, such as when the vehicle is being sold, when it is being insured, when it requires an inspection or when the owner of the vehicle needs to be identified through a government database of ownership records.

The VIN is found in several different places on the vehicle, such as an engraved stamp on a dashboard just behind a windshield or on a side panel of a door. The VIN located on the dashboard is usually difficult to read, as it is only visible in a small transparent opening of a tinted area of a windshield. The VIN on the dashboard is also created without any contrasting colors with its background, thus making the letters and numbers that make up the VIN difficult to distinguish. While a VIN on a side door panel may be more easily visible, it requires that the door be opened in order to see it. The VIN may also appear on an insurance identification card that a driver carries as proof of insurance coverage (see FIG. 1). However, all of the locations of the VIN provide challenges in properly imaging the VIN for mobile imaging purposes.

SUMMARY

Various embodiments disclosed herein are directed to methods of capturing Vehicle Identification Numbers (VIN) from images captured by a mobile device.

In one aspect, a method for identifying a field in an image of a non-document, comprising: receiving an image which includes a vehicle identification number (VIN); making a color assumption with respect to the VIN; preprocessing the image; segmenting the image to identify candidate text strings that may include the VIN; performing an optical character recognition on the candidate text strings; validating the candidate text strings; and outputting a confirmed VIN value for nay validated candidate text strings.

Other features and advantages should become apparent from the following description of the preferred embodiments, taken in conjunction with the accompanying drawings.

BRIEF DESCRIPTION OF THE DRAWINGS

Various embodiments disclosed herein are described in detail with reference to the following figures. The drawings are provided for purposes of illustration only and merely depict typical or exemplary embodiments. These drawings are provided to facilitate the reader's understanding and shall not be considered limiting of the breadth, scope, or applicability of the embodiments. It should be noted that for clarity and ease of illustration these drawings are not necessarily made to scale.

FIG. 5B is a high contrast grayscale image snippet of a VIN on a document, according to embodiments, according to embodiments.

The various embodiments mentioned above are described in further detail with reference to the aforementioned figured and the following detailed description of exemplary embodiments.

DETAILED DESCRIPTION

The embodiments described herein are related to system and methods for accurately capturing VIN data. Capturing VIN data can be useful in several applications, for example, insurance data capture applications. Certain embodiments are directed to the capture of VIN information in: (1) images of documents and (2) images of non-documents. It will also be understood that the systems and methods described herein could be applied to other types of fields or information, such as other barcode information including DataMatrix and QR-Code information as well as other types of identifiers such as license plates numbers, container and chassis IDs, and myriad other types of identifiers.

According to some embodiments, when dealing with document images the system can make an assumption that the image contains a rectangular-shaped document snippet which can be found, cropped, rotated and binarized by technique described in U.S. Pat. No. 7,778,457 (the '457 patent), entitled Systems and Methods for Mobile Image Capture and Processing of Checks, which is incorporated herein by reference as if set forth in full. In some embodiments, the system can also make an assumption that VIN (as any other text on documents) is darker than background. Such binary document image can be then processed via Dynamic Capture engine, as described in U.S. Pat. No. 8,379,914 (the '914 patent), entitled Systems and Methods for Mobile Imaging Capture and Remittance Processing, which is also incorporated herein by reference as if set forth in full, using the regular expression typical for VINs.

When dealing with non-document images however, one or more of the assumptions listed above may not apply. In these embodiments, a second set of assumptions can be used in the alternative. These assumptions can relate to, for example, color differences, font size, and/or text alignment. In some embodiments, these techniques for non-documents can also be used to capture license plates numbers, container and chassis IDs, and myriad other types of identifiers.

Figure 1:
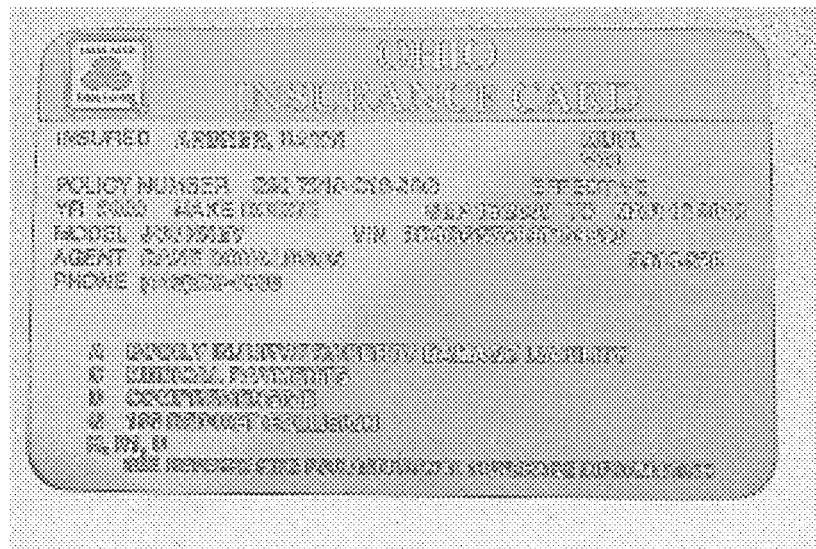
FIG. 1 is an image of an insurance identification card which includes a vehicle identification number (VIN), according to embodiments.

Insurance ID cards are documents which contain VINs for vehicles owned by the insured. An example image of an insurance ID card is depicted in FIG. 1.

Figure 2:
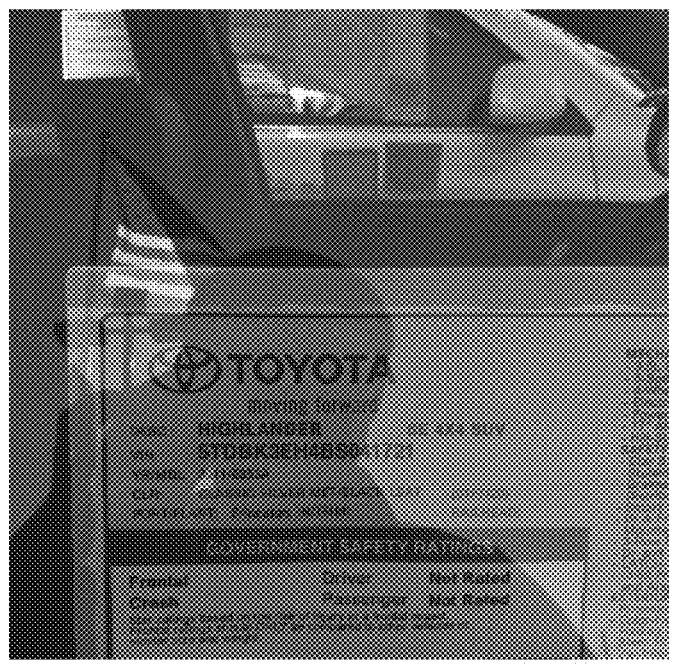
FIG. 2 is an image of a VIN on a Monroney sticker on a new car, according to embodiments.

Examples of the second category are images are so-called Monroney stickers—labels required in the United States to be displayed in all new automobiles and include VIN and other official information about the car. An example image of a VIN on a Monroney sticker is depicted in FIG. 2.

Figure 3:
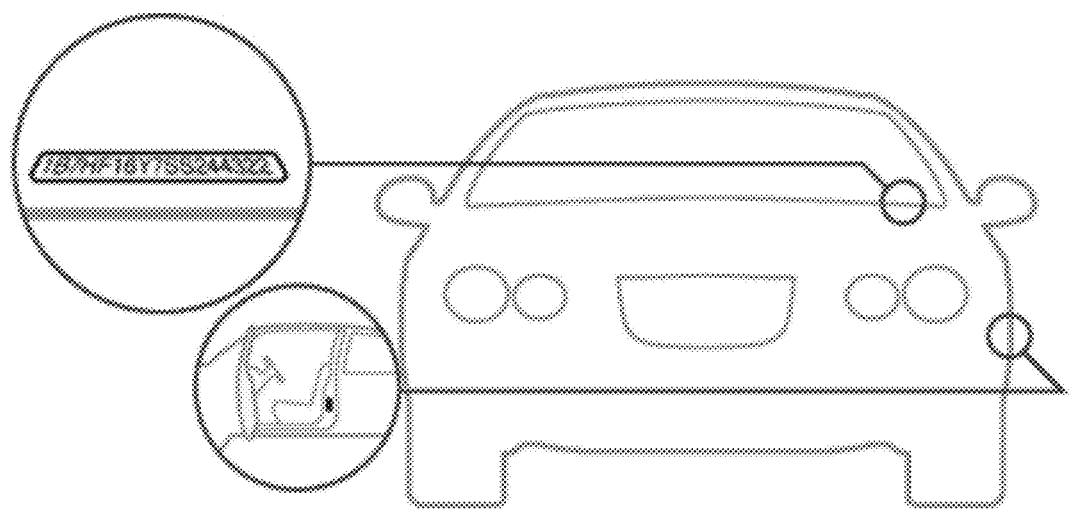
FIG. 3 illustrates the locations where a VIN number may be found on an automobile, according to embodiments.

Additional examples of the second category are those images of the VIN which can be found by looking at the dashboard on the driver's side of the vehicle or on the driver's side door. An example image of such a VIN is depicted in FIG. 3.

I. Capturing VIN from Document Images

In some embodiments, the method of capturing the VIN from document images can include mobile preprocessing (converting mobile 3D image into bitonal 2D image), preliminary VIN capture based on VIN definition and the postprocessing result using VIN mod 11 rule. Note also that in some embodiments, if the image is already 2D (e.g., scanned) and bitonal, mobile preprocessing may not be necessary.

Figure 4:
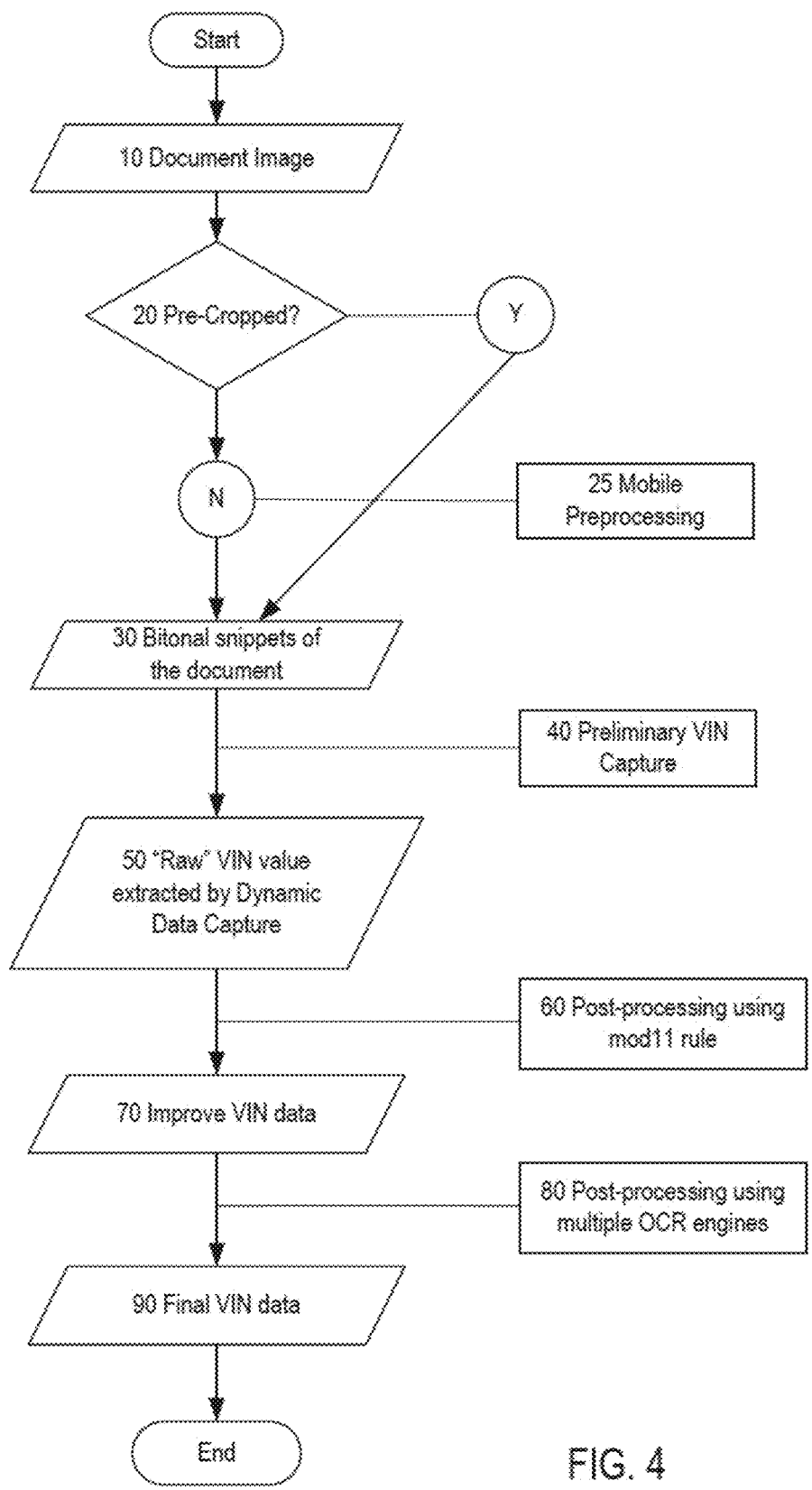
FIG. 4 is a flow diagram illustrating a method of capturing a VIN from a document image, according to embodiments.

FIG. 4 illustrates a flowchart of a method of capturing a VIN from an image of a document, in accordance with one embodiment. First, in step 10, a mobile image of a document, e.g., the ID card in FIG. 1, containing VIN is captured and the system confirms that the image is in fact a document. If the image is a document, then the process continues to step 20. If however, the image is of a non-document, then the process of FIG. 6 can be followed.

It will be understood that the term system in the preceding paragraph, and throughout this description unless otherwise specified, refers to the software, hardware, and component devices required to carry out the methods described herein. This will often include a mobile device that includes an image capture systems and software that can perform at least some of the steps described herein. In certain embodiments, the system may also include server side hardware and software configured to perform certain steps described herein.

In step 20, the system then determines whether the image of the document of step 10 is already pre-cropped and binarized. If it is, then the method can move to step 30. If not, then in step 25, the image can be pre-processed to frame, crop, binarize and clean up the image as through geometric correction. For example, the processes described in the '457 patent can be used to pre-process the image.

A bitonal snippet of the pre-processed image, or original depending on the determination in step 20, can then be further pre-processed in step 30. This further preprocessing can include a preliminary data capture of, e.g., VIN data. In certain embodiments, preliminary data capture can comprise a keyword-based search. Often, the VIN field has a well-known keyword associated with it. See for example field 101 in FIG. 1. For example, often the VIN field has one of the following keywords associated: VIN; V.I.N.; and Vehicle Identification Number. These key words can then be used to help find, although not necessarily uniquely, the field's location on about 85-90% of VIN-carrying documents. In remaining 10-15%% the keyword is either not printed or can't be found due to some combination of poor image quality, usage of small font, inverted text etc.

Thus, the system can be configured to search for keywords in the OCR result, e.g., using the Fuzzy Matching technique explained in the '914 patent. For example, if the OCR result contains "VPN" then the "VIN" keyword will be found with confidence of about 670, e.g., out of 1000 max, because 2 out of 3 non-space characters are the same as in the "VIN". However, if the OCR result contains "VlN" (with low-case L), the confidence will be above 900 because 'I' and 'l' are often confused by OCR engines.

In certain other embodiments, the preliminary data capture can include a format-based search. The VIN field's format is a combination of 17 digits and upper-case alphas, of which the last 6 characters are always digits. Thus, an analysis of the data format can be used by the system, possibly in combination with keyword-based search to narrow down or further narrow down the set of candidates for the field. An example of the format can be seen in the VIN field 102 adjacent to the keyword 101 in FIG. 1.

Thus, in certain embodiments, the systems searches for data below or to the right of each keyword found, e.g., using the Fuzzy Matching technique of the '914 patent. Each found location of data is assigned a format-based confidence, which reflects how close data in the found location matches an expected format. For example, the format-based confidence for "JTEGD20V54003598R" is about 940 (of 1000 max) for a VIN, because only 1 of 17 non-punctuation characters ("R") is inconsistent with the VIN format; however, the format-based confidence of "JTEGD20V54003S984" is higher (970-980) because 'S' is close to one of characters allowed by the format ('5').

Next, in step 50 a preliminary ("raw") VIN is extracted from the dynamic data capture process of step 40. Then, in step 60 post-processing can occur using, e.g., mod 11 redundancy. VINs have a check-digit redundancy: the 9th position is that of the check digit. This is explained at: <en.wikipedia.org/wiki/Vehicle_identification_number#Check_digit_calculation.>
We also describe Mod 11 rule below.

Weight Factor Table (from Wikipedia)

| Position | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| Weight | 8 | 7 | 6 | 5 | 4 | 3 | 2 | 10 | 0 | 9 | 8 | 7 | 6 | 5 | 4 | 3 | 2 |

The system can thus use this redundancy to significantly improve recognition accuracy and produce an improved VIN value in step 70.

Step 80 can then involve post-processing, using multiple OCR engines. In some embodiments, the system can use multiple OCR engines to recognize and re-recognize some VIN characters. One obstacle in using multiple OCR engines is the difficulty in deciding which OCR engine produced the correct result. However, due to Mod 11 redundancy, making such decision becomes significantly simpler.

A final VIN value can then be created in step 90.

Some embodiments are capable of processing multiple VINs, which is a typical scenario in many types of insurance ID cards, for example.

In some embodiments, VINs can be captured without using keywords in defining the field. If keywords are used, a single VIN adjacent to the keyword can be found according to some embodiments. On the other hand, if only VIN format is used, all VIN results can be included in step 50 according to some embodiments.

II. Capturing VIN from Non-Document Images

Figure 5A:
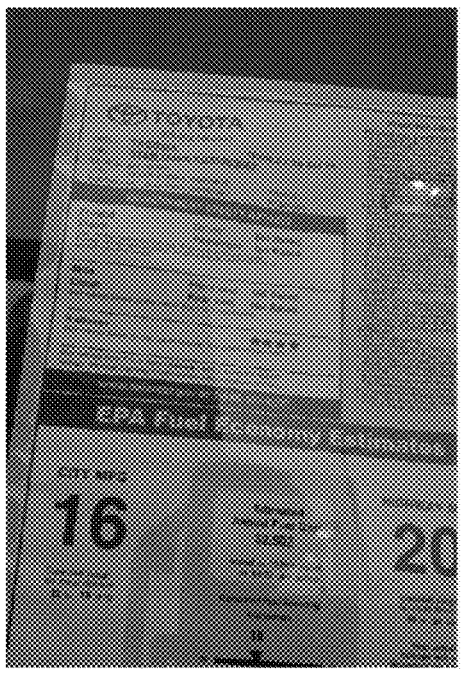
FIGS. 5A-5C are images of a VIN on a document which can be extracted using the methods described herein, according to embodiments.
Figure 5B:
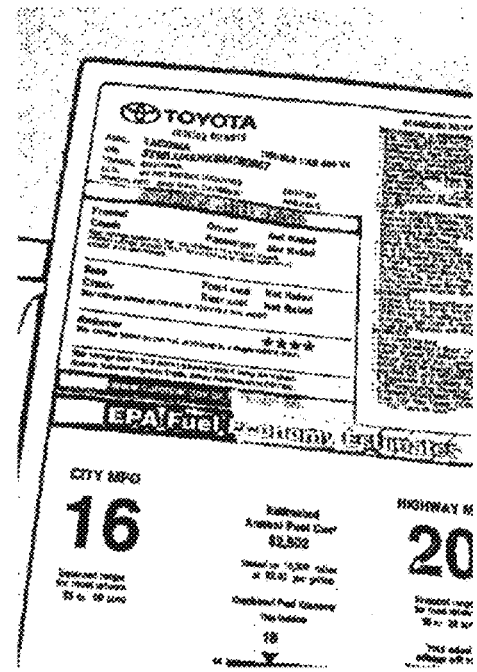
Figure 5C:
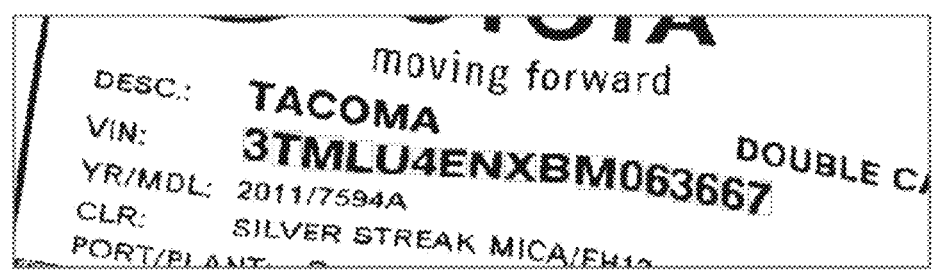

Various embodiments disclosed herein are directed to capturing VIN from non-document images (see, e.g., FIG. 5). For example, instead of auto-framing, cropping and binarizing the document snippet (as in the case of certain embodiments adapted to process document images), various embodiments disclosed herein can perform multiple attempts of text segmentation and recognition. These attempts can be based on various hypotheses about text color, font size, and text alignment as well as myriad other factors. In some embodiments, these techniques can also be used to capture license plates numbers, container and chassis IDs, and myriad other types of identifiers.

Figure 6:
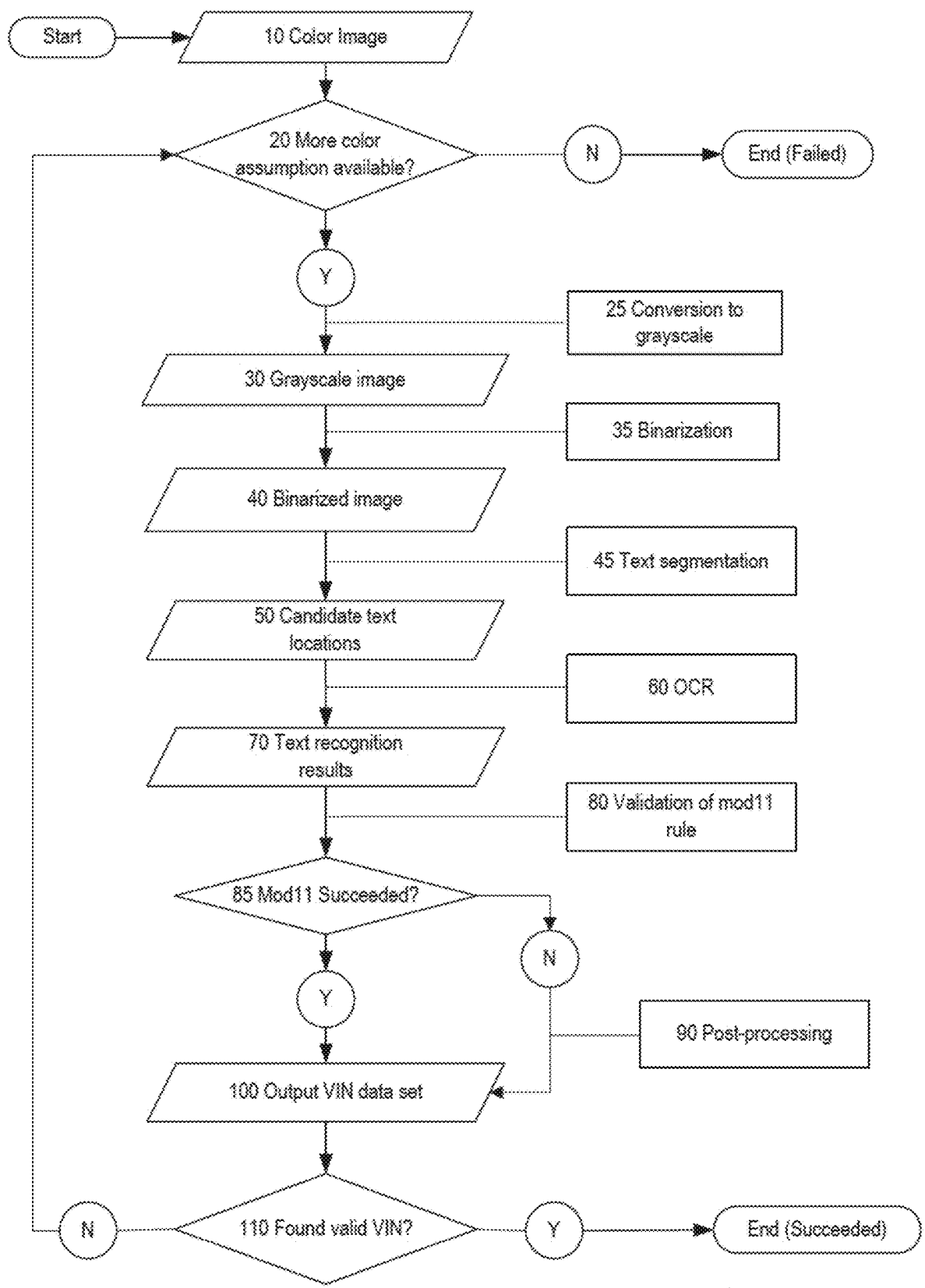
FIG. 6 is a flow diagram illustrating a method of capturing a VIN from a non-document image, according to embodiments.

FIG. 6 is a flowchart illustrating a method of capturing a VIN from a non-document image, in accordance with one embodiment. First, a non-document color image containing VIN received can be received in step 10. In step 20, an assumption about the, e.g., VIN color can be performed. Unlike document images where VIN is printed in dark color, as with most text, the color of VIN on non-document images is unknown. Thus, in step 20 multiple assumptions about VIN color can be made, which allows the system to do color filtering in RGB space. For example, a color assumption may be represented by set of three weights WR, WG and WB (WR+WG+WB=1.0) to generated the color conversion formula:

$$B(P)=(R(P)*WR+G(P)*WG+B(P)*WB)/3, \text{ where}$$

P=P(X, Y)—an arbitrary pixel on the image represented by its X and Y-coordinates B(P)—the computed brightness value of pixel P on the output grayscale image R(P), G(P) and B(P)—Red, Green and Blue color value of pixel P on the original color image.

Furthermore, since the VIN could be darker or lighter than background, for each color assumption two color=>grayscale conversion attempts can be performed in step 25: on "direct" image (assuming VIN is darker than background) and on inverted image (assuming VIN is lighter than background). The formula for the latter is B(P)=((255−R(P))*WR+(255−G(P))*WG+(255−B(P))*WB)/3, where all terms have the same meaning as above.

The total number of assumptions as well as their order can be configurable and could be established experimentally, but the "equal" weights assumption (WR=WG=WB=⅓) will work in about 80% of all cases.

If all color assumptions are exhausted in step 20, the process fails. Otherwise as noted above, the process proceeds to step 25, where the conversion of the image from color, e.g., 24 bit/pixel is converted to grayscale at, e.g., 8 bit/pixel and a grayscale image is created in step 30. In step 35, the grayscale image of step 30 can be converted into a bitonal image, i.e., I bit/pixel, to produce a binarized, or bitonal image in step 40. Once a grayscale image is created according to color assumption in step 20, the further color reduction could be made by applying an adaptive binarization process to the grayscale image. The resulting image will have 1 bit/pixel color depth. The system can be configured to then use an adaptive binarization technique, e.g., as explained in the '456 patent to do the binarization. See FIG. 5B as an example of binarized image for the original image shown in FIG. 5A.

Text segmentation of the binarized image can then occur in step 45. In some embodiments, the detection of a candidate text string, step 50, is done using connected component analysis (CCA) and/or clustering, e.g., as described in the QuickFX API Interface Functions, published by Mitek Systems, Inc. (1999). CCA can be used to locate all possible text characters. In some embodiments, individual connected components found by CCA can be individual characters, parts of (broken) characters and/or multiple (merged) characters. Clustering can be used to find properly aligned and adjacent groups of connected components. In some embodiments, such groups (clusters) can constitute the set of potential VIN candidates.

OCR can then be applied to the candidate text strings, in step 60, and OCR results generated in step 70. These results can include ASCII strings created for the candidate strings of step 50. Validation, e.g., of mod 11 rule can then occur in step 80, which can also include post processing of strings that don't comply.

Post-processing can then be performed on validated (step 85) strings in step 90. For example, if a particular ASCII candidate string created in step 70 doesn't meet Mod 11 rule, the system tries to correct the string in order to satisfy the Mod 11 rule. The following operations could be performed during the postprocessing:

1. replacing characters by other(s) with similar shape. For example, "JTEGD20VS40035984" doesn't meet the Mod 11 rule, but replacing S by 5 which has a similar shape and turns the string into "JTEGD20V540035984" will satisfy the rule;
2. trying different OCR engines in order to re-recognized some or all characters; and
3. using second alternatives of OCR recognition for OCR engines that provide multiple recognition results per character.

A VIN data set can be output in step 100. In step 110 the output data set can be checked to ensure it is not empty. If at least one VIN is found, then the process can end. Otherwise, the process returns to step 20 where another color assumption can be made.

Figure 7A:
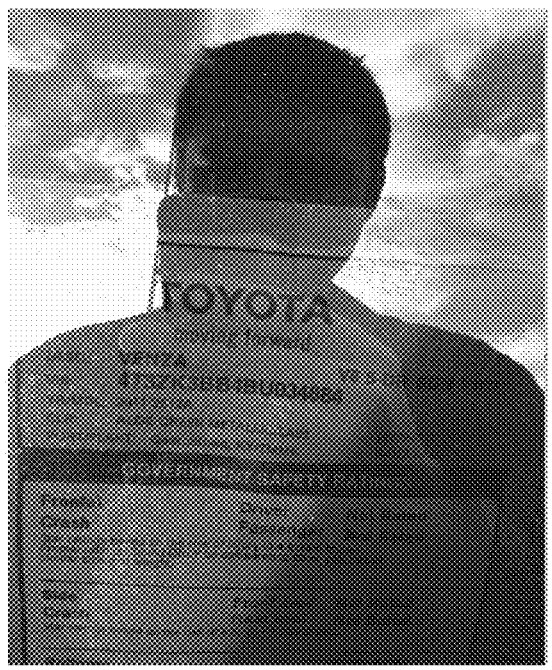
FIGS. 7A-7C are images of documents which include a VIN number that needs to be identified, in accordance with various embodiments.
Figure 7B:
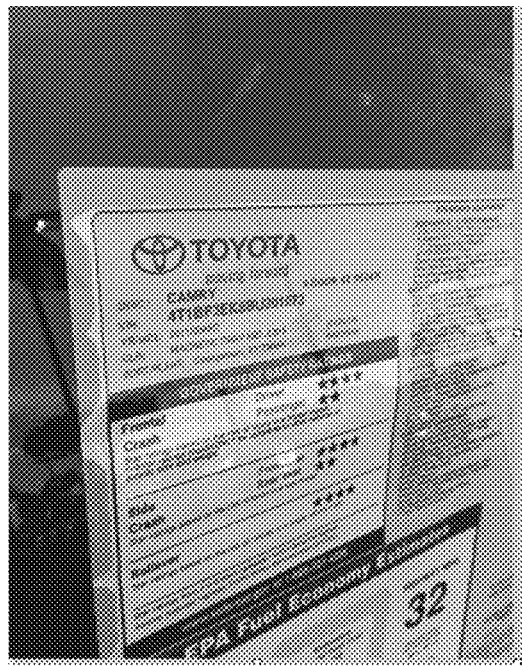
Figure 7C:
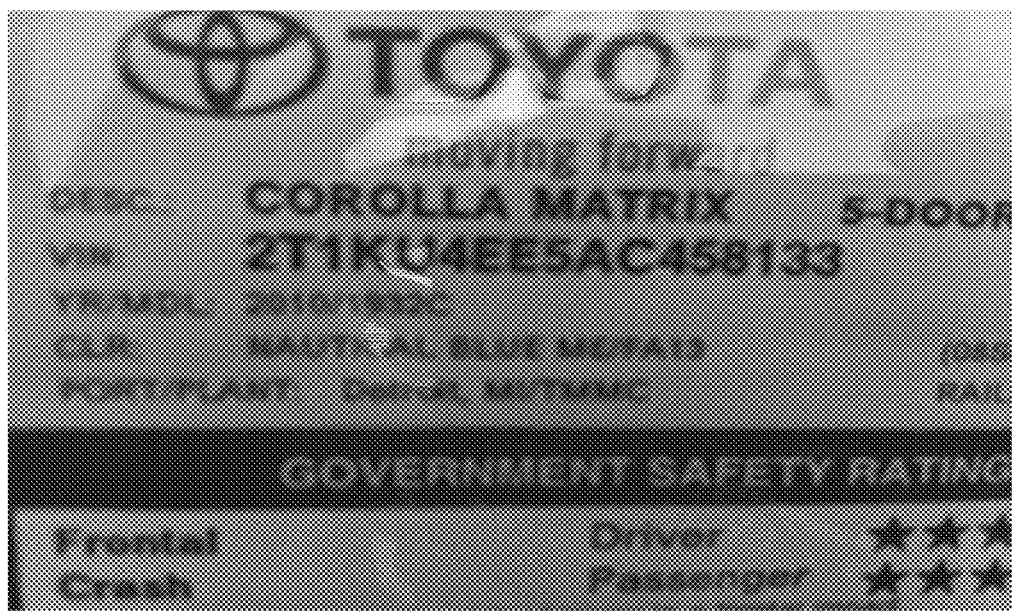

Various embodiments offer a solution for capturing a VIN from non-document images. Advantageously, various embodiments are capable of handling many challenges. FIGS. 7A-7C are examples of the types of challenges that can be handled by various embodiments of the present disclosure. FIG. 7A is an image of a new car sticker on the inside of a car window, such that the captured image has significant reflections, shadows, noise and other distortions which make identifying the VIN from the image difficult.

FIG. 7B is an image of a new car sticker taken at an angle which would require skew correction, and FIG. 7C is an image of the new car sticker that is out of focus, and is populated with shadows and reflections.

Figure 8:
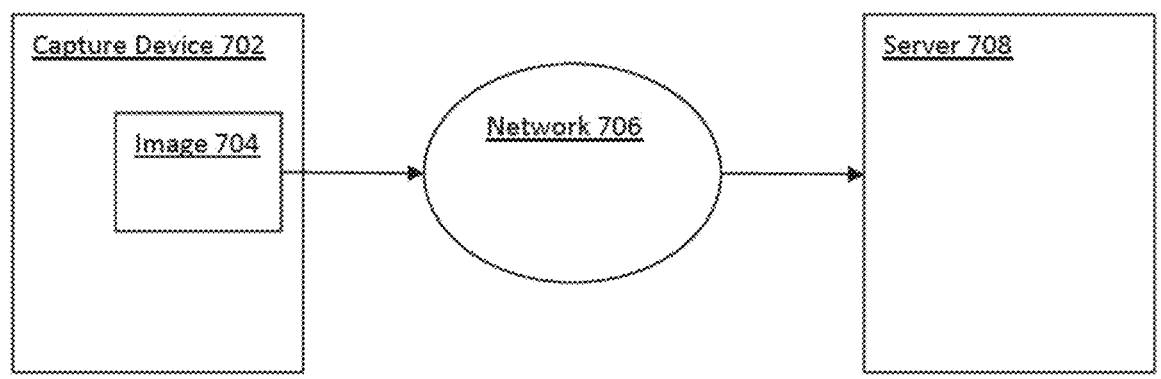
FIG. 8 is one embodiment of a network upon which the methods described herein may be implemented.

FIG. 8 is one embodiment of a network upon which the methods described herein may be implemented. As can be seen, the network connects a capture device 702, such as a mobile phone, tablet, etc., with a server 708. The capture device 702 can include an image 704 that is captured and, e.g., at least partially processed as described above and transmitted over network 706 to server 708.

Figure 9:
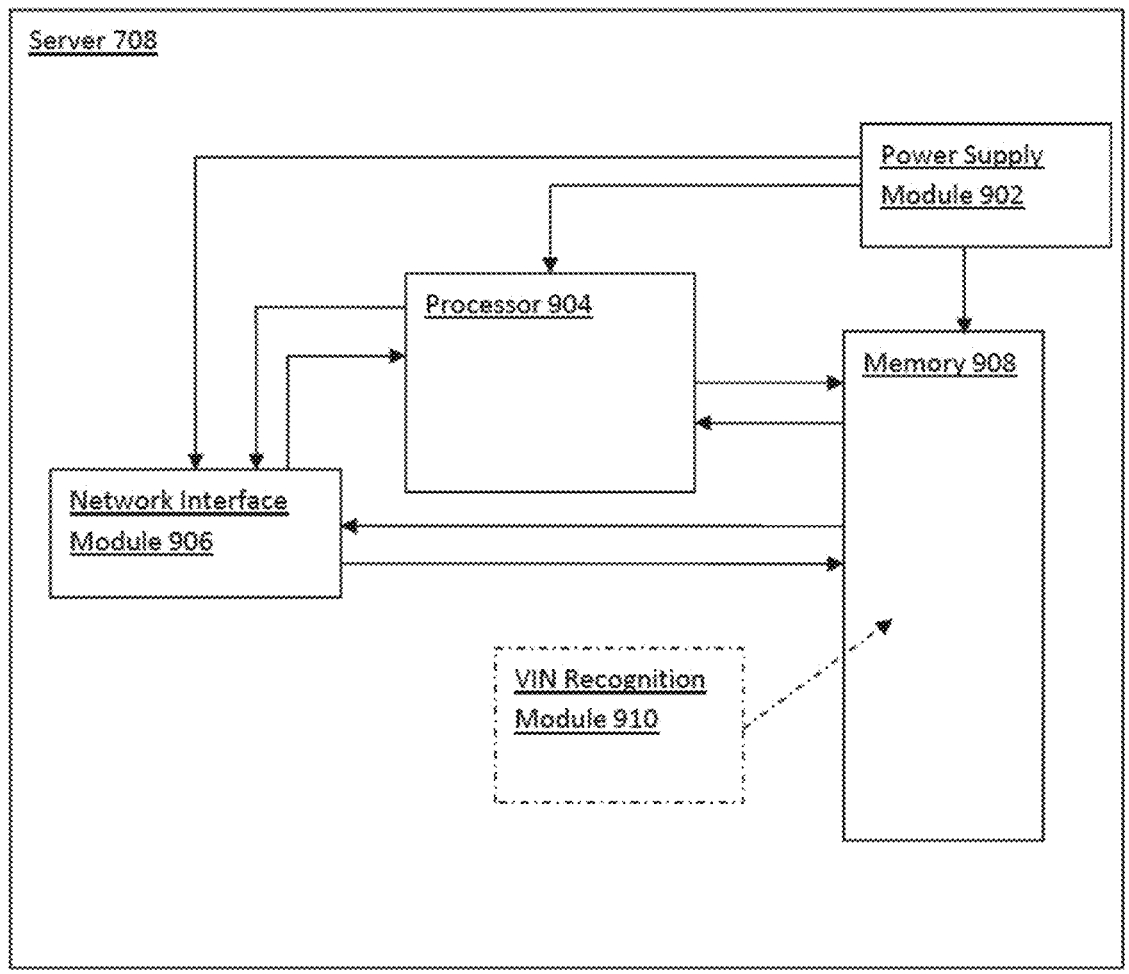
FIG. 9 is an embodiment of a computer, processor and memory upon which a mobile device, server or other computing device may be implemented to carry out the methods described herein.

FIG. 9 is an embodiment of a computer, processor and memory upon which a mobile device, server or other computing device may be implemented to carry out the methods described herein. In the example, of FIG. 9, a network interface module 906 can be configured to receive image 704 over network 706. Image 704 can be stored in memory 908. A processor 904 can be configured to control at least some of the operations of server 708 and can, e.g., be configured to perform at least some of the steps described herein, e.g., by implementing software stored in memory 908. For example, a VIN recognition module 910 can be stored in memory 908 and configured to cause processor 904 to perform at least some of the steps described above.

Power supply module 902 can be configured to supply power to the components of server 708.

While various embodiments have been described above, it should be understood that they have been presented by way of example only, and not of limitation. The breadth and scope should not be limited by any of the above-described exemplary embodiments. Where this document refers to technologies that would be apparent or known to one of ordinary skill in the art, such technologies encompass those apparent or known to the skilled artisan now or at any time in the future. In addition, the described embodiments are not restricted to the illustrated example architectures or configurations, but the desired features can be implemented using a variety of alternative architectures and configurations. As will become apparent to one of ordinary skill in the art after reading this document, the illustrated embodiments and their various alternatives can be implemented without confinement to the illustrated example. One of ordinary skill in the art would also understand how alternative functional, logical or physical partitioning and configurations could be utilized to implement the desired features of the described embodiments.

Furthermore, although items, elements or components may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

What is claimed is:

1. A non-transitory computer readable medium containing instructions which, when executed by a computer, perform a process comprising:
   receiving an image which includes a vehicle identification number (VIN);
   making a color assumption with respect to the VIN;
   identifying candidate text strings that may include the VIN;
   performing an optical character recognition (OCR) on the candidate text strings;
   sending the candidate text strings for validation; and
   in response to the candidate test string being validated, receiving a confirmed VIN value for the validated candidate text strings.

2. The non-transitory computer readable medium of claim 1, wherein validating the candidate text strings comprises performing a redundancy test.

3. The non-transitory computer readable medium of claim 2, wherein the redundancy test includes a mod 11 rule test.

4. The non-transitory computer readable medium of claim 1, wherein performing an optical character recognition on the candidate text strings produces ASCII text strings for each candidate text string.

5. The non-transitory computer readable medium of claim 1, wherein the color assumption may be represented by set of three weights WR, WG and WB (WR+WG+WB=1.0) to generate a color conversion formula:

$$B(P)=(R(P)*WR+G(P)*WG+B(P)*WB)/3, \text{ where}$$

P=P(X, Y)—an arbitrary pixel on the image represented by its X and Y-coordinates,
B(P)—a computed brightness value of pixel P on output gray scale image, and
R(P), G(P) and B(P)—Red, Green and Blue color value of pixel P on an original color image.

6. The non-transitory computer readable medium of claim 1, further comprising post processing candidate text strings that fail validation.

7. The non-transitory computer readable medium of claim 6, wherein the post processing comprises using second alternatives of OCR recognition for OCR engines that provide multiple recognition results per character.

8. A system for identifying a field in an image of a non-document, comprising:
   a mobile device, the mobile device comprising:
      a memory configured to store the image, and
      a processor coupled with the memory, the processor configured to capture an image which includes a vehicle identification number (VIN) and cause the mobile device to transmit the captured image to a server; and
   a server configured to:
      receive the captured image,
      make a color assumption with respect to the VIN,
      identify candidate text strings that may include the VIN,
      perform an optical character recognition (OCR) on the candidate text strings,
      send the candidate text strings for validation, and
      in response to a candidate test string being validated, receive a confirmed VIN value for the validated candidate text strings.

9. The system of claim 8, wherein validating the candidate text strings comprises performing a redundancy test.

10. The system of claim 9, wherein the redundancy test includes a mod 11 rule test.

11. The system of claim 8, wherein performing an optical character recognition on the candidate text strings produces ASCII text strings for each candidate text string.

12. The system of claim 8, wherein the color assumption is represented by set of three weights WR, WG and WB (WR+WG+WB=1.0) to generate a color conversion formula:

$$B(P)=(R(P)*WR+G(P)*WG+B(P)*WB)/3, \text{ where}$$

P=P(X, Y)—an arbitrary pixel on the image represented by its X and Y-coordinates, B(P)—a computed brightness value of pixel P on output gray scale image, and R(P), G(P) and B(P)—Red, Green and Blue color value of pixel P on an original color image.

13. The system of claim 8, wherein the server is further configured to post process candidate text strings that fail validation.

14. The system of claim 13, wherein the post processing comprises using second alternatives of OCR recognition for OCR engines that provide multiple recognition results per character.

15. A method for identifying a field in an image of a non-document, comprising:

capturing an image using a mobile device that includes a vehicle identification number (VIN);

transmitting the image to a server;

the server making a color assumption with respect to the VIN;

the server identifying candidate text strings that may include the VIN;

the server performing an optical character recognition (OCR) on the candidate text strings;

the server sending the candidate text strings for validation; and the server, in response to a candidate test string being validated, receive a confirmed VIN value for the validated candidate text strings.

16. The method of claim 15, wherein validating the candidate text strings comprises performing a redundancy test.

17. The method of claim 16, wherein the redundancy test includes a mod 11 rule test.

18. The method of claim 15, wherein performing an optical character recognition on the candidate text strings produces ASCII text strings for each candidate text string.

19. The method of claim 15, wherein the color assumption may be represented by set of three weights WR, WG and WB (WR+WG+WB=1.0) to generate a color conversion formula:

$$B(P)=(R(P)*WR+G(P)*WG+B(P)*WB)/3, \text{ where}$$

P=P(X, Y)—an arbitrary pixel on the image represented by its X and Y-coordinates, B(P)—a computed brightness value of pixel P on output grayscale image, and R(P), G(P) and B(P)—Red, Green and Blue color value of pixel P on an original color image.

20. The method of claim 15, further comprising the server post processing candidate text strings that fail validation.

* * * * *